US010713732B2

(12) United States Patent
Shak et al.

(10) Patent No.: US 10,713,732 B2
(45) Date of Patent: Jul. 14, 2020

(54) SYSTEM AND METHOD FOR IMPLEMENTING UNIFIED BILLING AND UNIFIED RATING OPERATIONS

(71) Applicant: NETSUITE INC., San Mateo, CA (US)

(72) Inventors: Dennis Paul Shak, Saratoga, CA (US); Jeremy John Blanchard, San Carlos, CA (US); Andrew Owen Vincent, Knowle Fareham (GB); Peter Fung, San Mateo, CA (US); Xiaozheng (Michael) Ye, Foster City, CA (US); Stephen Clode, San Jose, CA (US); Truman (Clyde) Adley, Jr., Austin, TX (US); Christopher Craxton, Austin, TX (US); Jeffrey Jones, Larkspur, CA (US); Brian Purville, San Francisco, CA (US)

(73) Assignee: NETSUITE, INC., San Mateo, CA (US)

( * ) Notice: Subject to any disclaimer, the term of this patent is extended or adjusted under 35 U.S.C. 154(b) by 524 days.

(21) Appl. No.: 15/380,903

(22) Filed: Dec. 15, 2016

(65) Prior Publication Data

US 2017/0236218 A1    Aug. 17, 2017

Related U.S. Application Data

(63) Continuation-in-part of application No. 14/708,039, filed on May 8, 2015, now Pat. No. 9,892,467.
(Continued)

(51) Int. Cl.
*G07B 17/00* (2006.01)
*G06Q 40/00* (2012.01)
*G06Q 30/04* (2012.01)

(52) U.S. Cl.
CPC ............ *G06Q 40/12* (2013.12); *G06Q 30/04* (2013.01)

(58) Field of Classification Search
CPC .............................. G06Q 40/12; G06Q 30/04
(Continued)

(56) References Cited

U.S. PATENT DOCUMENTS

| 7,444,672 B2 * | 10/2008 | Ellmore | G06Q 20/108 |
| | | | 705/42 |
| 8,224,666 B1 * | 7/2012 | Watt | G06Q 30/04 |
| | | | 705/2 |

(Continued)

OTHER PUBLICATIONS

Patent and Trademark Final Office Action in co-pending U.S. Appl. No. 14/708,039, filed May 8, 2015; notification dated Jun. 16, 2017.

*Primary Examiner* — Rokib Masud
(74) *Attorney, Agent, or Firm* — Kraguliac Law Group, LLC

(57) ABSTRACT

Systems and methods of processing business related data arising from multiple revenue sources (e.g., sales, subscriptions, professional services, vendors, etc.). In some embodiments, the inventive system and methods enable a more flexible and efficient approach to identifying revenue source events (mediation), pricing those events (typically as part of a rating process), and subsequently leveraging those "ratable events" in the billing and revenue recognition subsystems according to configurable rules and schedules. Data regarding those charges or other aspects of a ratable event may then be used and processed by multiple sub-systems that are part of operating a business; such sub-systems may include one or more of ERP, CRM, HCM, financial, accounting, taxation, or other business-related system or function.

20 Claims, 8 Drawing Sheets

Related U.S. Application Data

(60) Provisional application No. 62/268,396, filed on Dec. 16, 2015.

(58) Field of Classification Search
USPC .................................................. 705/26, 30
See application file for complete search history.

(56) References Cited

U.S. PATENT DOCUMENTS

| | | | | |
|---|---|---|---|---|
| 2005/0004867 A1* | 1/2005 | Spector | .................. | G06Q 20/00 705/39 |
| 2010/0076776 A1* | 3/2010 | Kopko | .................. | G06Q 30/02 705/14.1 |

* cited by examiner

SYSTEM AND METHOD FOR IMPLEMENTING UNIFIED BILLING AND UNIFIED RATING OPERATIONS

CROSS REFERENCE TO RELATED APPLICATION

This application claims the benefit of U.S. Provisional Application No. 62/268,396, entitled "System and Method for Implementing Unified Billing and Unified Rating," filed Dec. 16, 2015, which is incorporated herein by reference in its entirety (including the Appendix) for all purposes. This application is a continuation-in-part of pending U.S. patent application Ser. No. 14/708,039, entitled "System and Method for Implementing Charge Centric Billing", filed May 8, 2015.

BACKGROUND

In a typical business environment, a business may generate revenue as a result of various activities and deliverables for their customers and/or clients. Often, a business may have multiple sources of revenue, e.g., sales orders, manual invoices, projects, subscriptions, CSV Imports, or third party rating engines. However, having multiple and different sources for revenue can present difficulties for conventional approaches used to price, bill, and recognize revenue for those source events. This is because traditional approaches are often focused on a single source of revenue and do not offer enough flexibility in the pricing, billing, and revenue recognition solution components. For example, a system may track fulfillment events for shipping inventory items, but is not suitable for tracking the recurring charges incurred as part of the associated support contract. It may also lack the flexibility to properly price those support charges, as the system is focused on pricing discrete physical deliverables. This is particularly cumbersome due to recent industry trends where more businesses offer hybrid "bundled" offerings that include not only physical items, but also recurring support components, and services to configure those devices. Further complicating these challenges are customers' desires to see a unified invoice covering all of their billable items, along with recent revenue recognition changes that require that revenue be allocated across all of the components contributing to this total bundle; this requires a single system that can address the recognition of revenue from a variety of sources simultaneously. Of course, these complex billing and revenue recognition requirements are accompanied by an equivalently complicated set of reporting requirements addressing needs around forecasting and what-if scenarios that are often met by attempting to combine data from a disparate set of domain-specific applications.

For example, a charge derived from a subscription service may impact multiple aspects of the data used to generate the types of reports desired by users. In the case of a report or reports generated in response to a request submitted by users of an enterprise-wide Customer Relationship Management (CRM) system, the affected sub-systems or records may include those of a billing record system, a revenue tracking system, and/or a report generating system. Thus, a single subscription service charge may impact more than the sub-system it is directly associated with. Similarly, even a one-time sales order may have an impact on one or more of the mentioned sub-systems. Because of this possibility, each subsystem is typically configured in a manner so that it is capable of interfacing with multiple types of charges (i.e., there is a one-to-many relationship between a specific sub-system and multiple charge sources, and a corresponding one-to-many relationship between a specific charge source and the multiple sub-systems). As a result, multiple customized interfaces are maintained by a single business entity in order to encompass the ways or sources in which charges are generated, tracked and saved. Unfortunately, this approach of implementing a one-to-one customization between each of multiple subsystems and each of multiple charge sources is inefficient, prone to error, and difficult to maintain in proper relationship to each other when changes are made to one or more of the sub-systems and how a subs-system handles a charge.

Embodiments of the inventive system and methods are directed to overcoming the limitations associated with conventional approaches to configuring multiple business data processing sub-systems to accept and process data arising from multiple charge sources or other sources of ratable events, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems and methods of processing business related data arising from multiple revenue sources (e.g., sales, subscriptions, professional services, vendors, etc.). In some embodiments, the inventive system and methods enable a more flexible and efficient approach to identifying revenue source events (mediation), pricing those events (typically as part of a rating process), and subsequently leveraging those "ratable events" (i.e., rate-able) in the billing and revenue recognition sub-systems according to configurable rules and schedules. Data regarding those charges or other aspects of a ratable event may then be used and processed by multiple sub-systems that are part of operating a business; such sub-systems may include one or more of ERP, CRM, HCM, financial, accounting, taxation, or other business-related system or function.

In one embodiment, the invention is directed to an integrated business data processing system, where the system includes:

an electronic data processor programmed with a set of executable instructions, which when executed, cause the system to perform a mediation process operable to identify and access data associated with one or more events occurring as part of an operation of a business;

a rating process operable to determine a value of one or more of the identified events;

a scheduling process to determine how a value or values of the one or more of the identified events are to be used for purposes of a revenue recognition process;

a charge generation process to determine how a value of one or more of the identified events are to be used for purposes of a billing process;

a process to create a journal entry in response to using the value or values of the one or more of the identified events for purposes of the revenue recognition process; and a process to create an invoice in response to using the value or values of the one or more of the identified events for purposes of the billing process.

In another embodiment, the invention is directed to a method of processing business data, where the method includes:

representing a set of events occurring as part of the operation of the business as one or more ratable events, wherein a ratable event is an event that generates data used to determine an item on an invoice or an event that generates data used to determine a revenue recognition schedule;

determining a first set of the one or more ratable events, wherein the determination is based on one or more of a rule, condition, constraint, comparison, or formula;

determining a value for each ratable event of the first set of ratable events, wherein the value is based on one or more of a rule, condition, constraint, comparison, or formula;

executing a scheduling process to determine how the value of each ratable event of the first set of ratable events is to be used for purposes of a revenue recognition process;

creating a journal entry in response to using the value of each ratable event of the first set of ratable events for purposes of the revenue recognition process;

determining a second set of the one or more ratable events, wherein the determination is based on one or more of a rule, condition, constraint, comparison, or formula;

determining a value for each ratable event of the second set of ratable events, wherein the value is based on one or more of a rule, condition, constraint, comparison, or formula;

executing a charge generation process to determine how the value of each ratable event of the second set of ratable events is to be used for purposes of a billing process; and creating an invoice in response to using the value of each ratable event of the second set of ratable events for purposes of the billing process.

Other objects and advantages of the present invention will be apparent to one of ordinary skill in the art upon review of the detailed description of the present invention and the included figures.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

Figure 1:
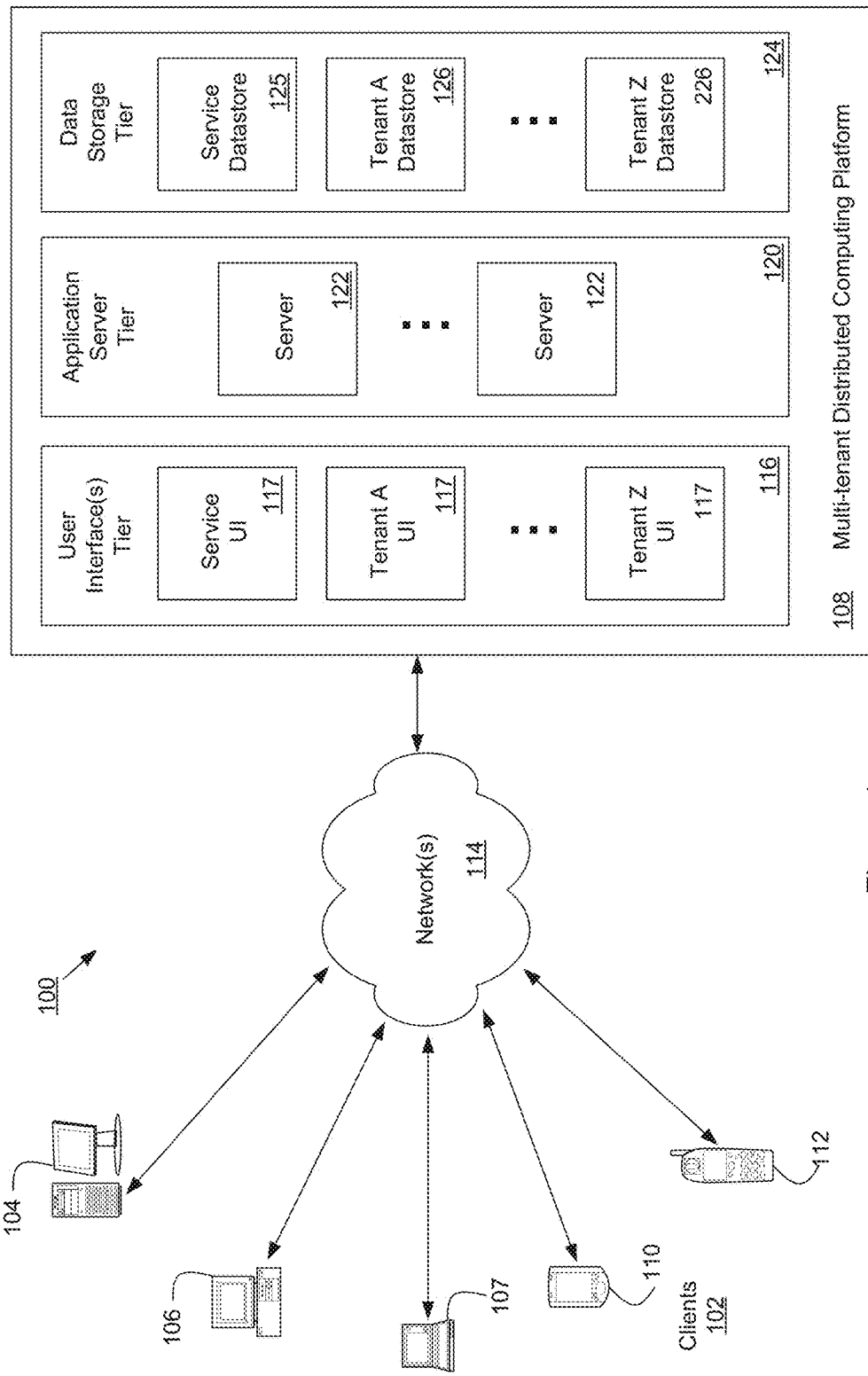
FIG. 1 is a diagram illustrating a system, including an integrated business system and an enterprise network, in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

A core concept of the invention is the definition of a unified framework that generalizes the processing and rating of business events that have an accounting impact. Although the inventors were motivated (at least in part) to create a solution for a generalized billing framework, the inventive system and methods can be applied generally to other business related functions or operations.

In some embodiments, the framework or architecture of the inventive system includes four configurable stages. The first stage, referred to as "mediation", generalizes the collection and processing of disparate business events that may need to be rated (valued). Next, a value is applied to the event based on a set of configurable and reusable rules (referred to as the "rating" stage). Third, these rated events are passed to a manager responsible for adjusting them for domain specific presentation. Fourth, scheduling and summarizing are applied to final accounting output as needed.

One example embodiment or implementation involves the generation and tracking of events for purposes of revenue recognition. Business events (such as project milestone, or goods shipment) that may trigger revenue recognition are fed into the engine and generate ratable (i.e., rate-able) events (the Mediation stage). These are valued for their revenue impact by applying a set of configurable rules (the Rating stage). For example, the event that a contract milestone has been reached may result in the first $10,000 of revenue against the project to be recognizable. The ratable events are passed to the revenue manager that converts the events into scheduled revenue (i.e., a revenue charge). The Revenue schedule manager takes scheduled revenue and collects and schedules it into the form of a revenue recognition journal over the necessary timeframe. For example, the revenue rules may specify that the delivery of a service rated at $1200 be spread as $100 revenue/month over the next year.

As noted, a motivation for the invention was to implement a billing system that services disparate sales operations (such as product, service, usage, support). In this embodiment, business events (such as a project milestone, a goods shipment, or data consumed) that may trigger a billable charge are fed into a rating engine and generate ratable (i.e., rate-able) events (the Mediation stage). These are valued (rated) for their billing impact by applying as set of configurable rules (the Rating stage). For example, a specific fulfillment event might be valued at $10/unit when fulfilled based on the sales agreement for an account. The ratable events are passed to a billing manager process or operation that handles timing and bill presentment (where these processes are generally configurable within the inventive system), finally generating a billable charge. For example, fulfillment events for an entire month might be aggregated into a single charge billable as of the $1^{st}$ of each month; an invoice manager process or operation collects charges and consolidates them into a bill/invoice at a desired date, time, or frequency. For example, charges for the prior 3 months may be collected together and billed on a quarterly invoice.

As recognized by the inventors, based on the implementation of an embodiment of the inventive unified billing engine, a variety of back office business processes are supported, including but not limited to, billing, revenue recognition, reporting, and forecasting. This produces an extensible system that provides comprehensive back office processes to be applied to a variety of business models, without many of the potential disadvantages associated with conventional approaches.

A key advantage of the inventive system is the ease with which new business models can be integrated in the future by utilizing the configuration capabilities built into the phases of the stages (i.e., the operations or functions performed by the rating engine, the scheduling engine, etc.). For example, the four independently configurable stages (mediation, rating, charge manager and schedule manager) identified above enable the flexible processing of multiple revenue sources in a coherent and consistent way.

While the mediation layer may need to translate diverse inputs, including things like inventory shipments, recurring subscription charges, usage-based charges, project-progress charges, or even custom user-defined inputs, the rating, charging, and recognition scheduling engines (which may be implemented as one or more computer executable processes, functions, or operations) can deal with the resulting ratable events uniformly and independently of their source type. Further, each of these three stages (i.e., rating, charging, and scheduling) can be (re)configured or overridden by the user without having to additionally provide the logic of the other two stages for each implementation, as would be the case in a conventional system. For example, a user could override the definition of the pricing engine (which may be part of a rating process or engine) by defining their own pricing methodology, while leveraging the standard charge and recognition scheduling methods or configurations. The use of the concept and implementation of a ratable event enables the assembly of a single, commonly accessible data record that contains the contributions from multiple sources, where each event may be triggered and/or defined by one or more rules.

Furthermore, the triggering conditions or parameters may be derived from events occurring in a sub-system of a business data processing platform or system. This permits the determination of an amount to be based on an event (the ratable event) associated with a source, where that amount can depend on one or more values of a specific set of business parameters (such as, but not limited to, inventory level, revenue, sales, profit, etc.). The rated (processed) ratable event may then be accessed and processed by one or more bushiness data processing systems or sub-systems for purposes of planning, financials, reporting, reconciling, revenue recognition, etc.

Thus, in some embodiments, a resulting ratable event record may contain data corresponding to multiple charge amounts, with each of those charge amounts generated by a source as a result of the ratable event being rated, and with the generation of the amount (i.e., the "trigger" for causing a charge amount to be generated) and the amount itself determined based on one or more rules, conditions, system parameters, data values, etc. This enables the determination of whether an event is generated and the amount of the charge or cost associated with an event to be a function of (or otherwise dependent upon) one or more parameters related to the operation of a business, such as the value of a business relevant characteristic that is part of a workflow (e.g.; an inventory level, sales velocity, occurrence of a specific event, revenue target, etc.).

In some examples, one or more of the various embodiments of the invention may be implemented in the context of a multi-tenant, "cloud" based environment (such as a multi-tenant business data processing platform), typically used to develop and provide web services and business applications for end users. This exemplary implementation environment will be described with reference to FIGS. 1-3 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system, including an integrated business system and an enterprise network, in which an embodiment of the subject matter disclosed herein may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be embodied as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service (platform) data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, financials, and the like. Data stores may be implemented with any suitable data storage technology, including structured query language (SQL) based relational database management systems (RDBMS).

In accordance with one embodiment, the distributed computing service/platform 108 may be a multi-tenant and service platform and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. Such functions or business applications are typically implemented by one or more modules of software code/instructions that are maintained on and executed by one or more servers 122 that are part of the platform's Application Server Tier 120.

In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system 108 shown in FIG. 1 may be hosted on a distributed computing system made up of at least one, but typically multiple, "servers." A server is a physical computer dedicated to providing data storage and an execution environment for one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system (as described above) in the context of a multi-tenant platform, wherein individual instantiations of a single comprehensive integrated business system (and its related applications and functions) are provided to a variety of tenants. However, one challenge in such multi-tenant platforms is the ability for each tenant to tailor their instantiation of the integrated business system to their specific business needs and workflow.

In one embodiment, this limitation may be addressed by abstracting the desired modifications away from the codebase (i.e., at a different and typically higher level of the implementation) and instead supporting the increased functionality through the use of custom transactions as part of the application itself. Prior to discussing further aspects of custom transactions, additional aspects of the various computing systems and platforms are discussed with respect to FIG. 2.

Figure 2:
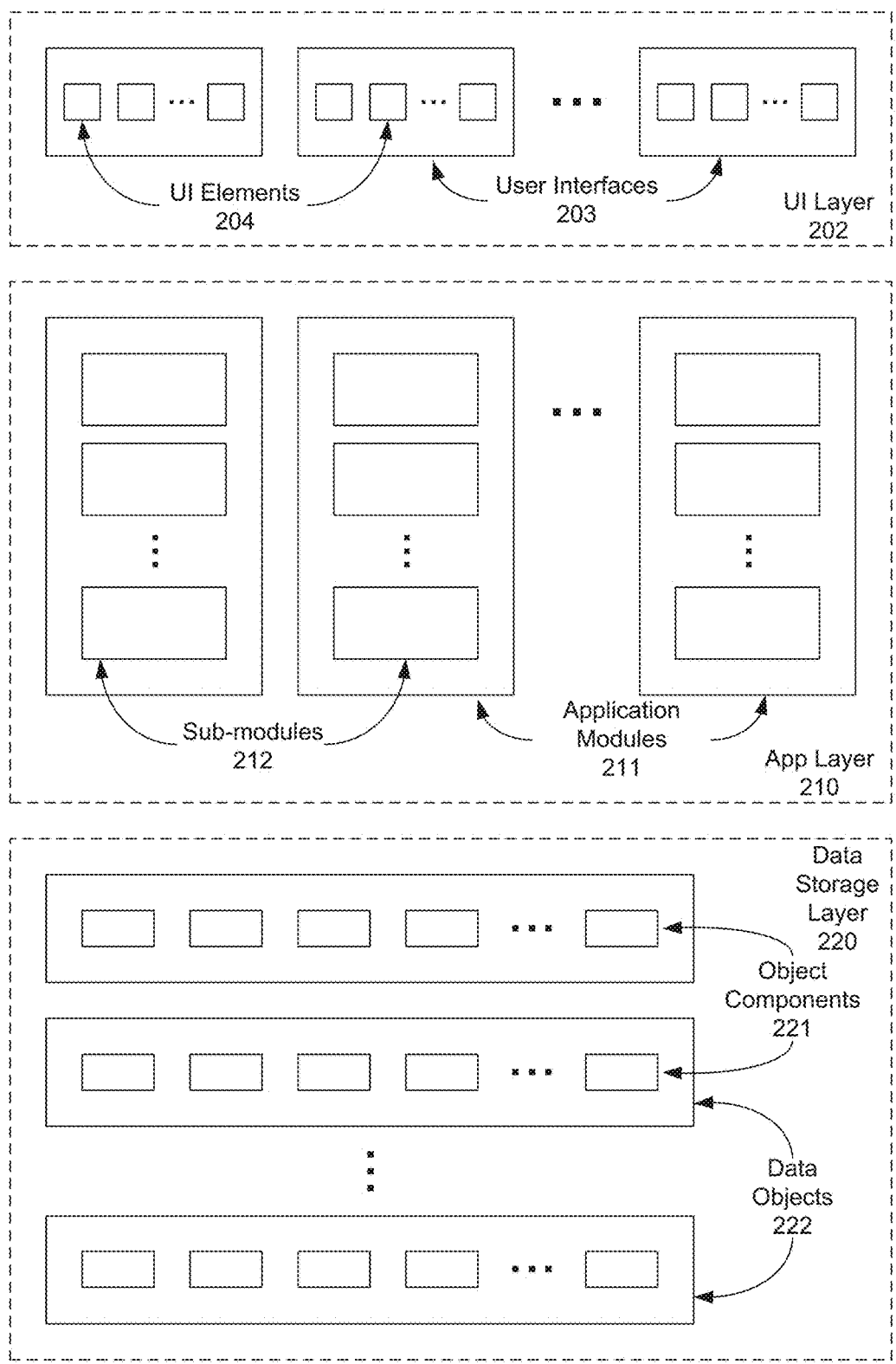
FIG. 2 is a diagram illustrating additional details of the elements or components of the multi-tenant distributed computing service platform of FIG. 1, in which an embodiment of the subject matter disclosed herein may be implemented.

FIG. 2 is a diagram illustrating additional details of the elements or components of the multi-tenant distributed computing service platform of FIG. 1, in which an embodiment of the subject matter disclosed herein may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the software system or architecture of the multi-tenant distributed computing service platform of FIG. 1 are shown. The example architecture 200 includes a user interface layer or tier 202 having one or more user interfaces 203. Examples of such user interfaces include graphical user interfaces and application programming interfaces (APIs). Each user interface may include one or more interface elements 204. Users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces (APIs) may be local or remote, and may include interface elements such as parameterized procedure calls, programmatic objects and messaging protocols.

The application layer 210 may include one or more application modules 211, each having one or more sub-modules 212. Each application module 211 or sub-module 212 may include instructions, which when executed by a suitably programmed electronic processor (such as a CPU found in a server, computing device, computing or data processing system, etc.), causes the performance of a set of stages or steps that correspond to a particular function, method, process, or operation implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

creating, defining, or establishing a record for a specific ratable event or instance, with the record being associated with one or more attributes, the attributes being defined by data that is used to characterize the ratable event/instance;

implementing (and in some cases allowing a user to implement) one or more rules, relationships, conditions, or criteria that determine (a) whether a ratable event is generated by a source (or potential source) of revenue, and (b) the amount or value of the ratable event, where such rules, relationships, conditions, or criteria may depend on one or more of a value (or values) of business related data for an account or user (e.g., ERP data, CRM data, financial data, orders, sales, revenue, the magnitude, trends or velocities of business metrics), an indicator of resource usage, an indicator of platform or other services used or accessed, etc.;

the occurrence or lack of occurrence of an event that is part of a workflow or project (e.g., a milestone, an event signifying the completion of a phase or key indicia for a project or service, an event signifying the need for a specific service, etc.); or a specific time or date (e.g., time of day, day of the week, month, etc.).

populating the record with data from a source or sources of a ratable event, such that the data associated with the ratable event may be represented (in whole or in part) by one or more of the attributes of the record;

accessing and retrieving data from a record or records using a process that operates to assemble data regarding events stored in one or more records (where this process may be part of a workflow for generating a report, invoice, forecast, depreciation schedule, statement, journal entry, etc.); and implementing (and in some cases allowing a user to implement) one or more rules, relationships, conditions, or criteria that determine which of multiple records to access in determining a total charge for a task or transaction, where the rules, relationships, conditions, or criteria may depend on one or more of a value (or values) of business related data for an account or user (e.g., ERP data, CRM data, financial data, orders, sales, revenue, the magnitude, trends or velocities of business metrics), an indicator of resource usage, an indicator of platform or other services used or accessed, etc.;

the occurrence or lack of occurrence of an event that is part of a workflow or project (e.g., a milestone, an event signifying the completion of a phase or key indicia for a project or service, an event signifying the need for a specific service, etc.); or a specific time or date (e.g., time of day, day of the week, month, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 1) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Figure 3:
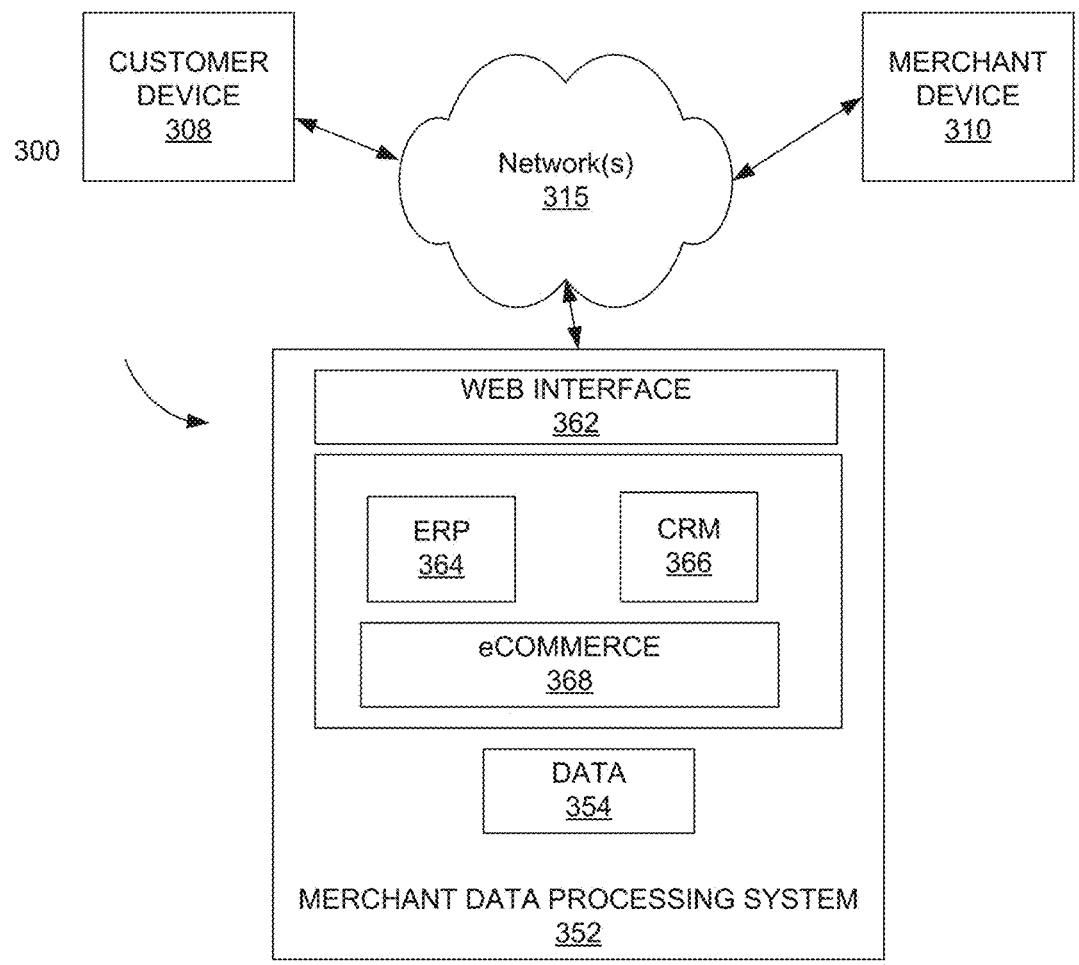
FIG. 3 is a diagram illustrating elements or components of an example operating environment in which an embodiment of the subject matter disclosed herein may be implemented.

FIG. 3 is a diagram illustrating elements or components of an example operating environment in which an embodiment of the subject matter disclosed herein may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and/or 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications (e.g., financial, HR, etc.) that provide services and functionality to customers and/or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a database) that can be accessed remotely over a network. Although further examples below may reference the example computing environment depicted in FIGS. 1-3, it will be apparent to one of skill in the art that the examples may be adapted for alternate computing devices, systems, and environments.

Figure 4:
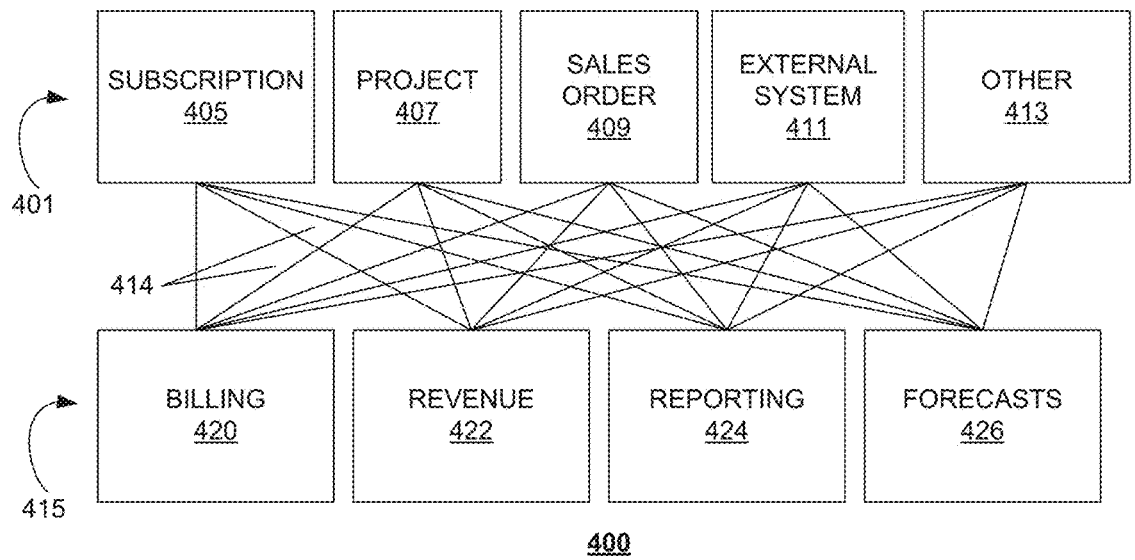
FIG. 4 is a diagram of a conventional system illustrating the multitude of possible relationships between a set of sources of charges and a set of possible uses of the charges as part of generating information about a business and its operations.

Turning to the next figures, FIG. 4 is a diagram of a conventional system 400 illustrating the multitude of possible relationships between a set of sources of revenue generation (as suggested by processes 401) and a set of possible uses of the resulting revenue data as part of generating information about a business and its operations (as suggested by applications or sub-systems 415). In the illustration, several different sub modules in a system, referred to collectively as revenue generation processes 401, may be available for a user of the overall merchant data processing system 352 (FIG. 3). Among the example or potential revenue generation processes illustrated are a subscription type process 405, a project type process 407, a sales order type process 409, an external system type process 411, and other type processes 413. These processes 401 may be available for use in determining an overall revenue amount for a transaction or for an event that is part of a workflow, with a user able to define specific types of revenue-generating events (such as with respect to amounts, time, recurrence, and the like).

For example, a subscription type revenue process 405 may generate a recurring revenue amount, whereas a sales order revenue amount 409 may be a one-time event. A project type revenue amount 409 may be dependent on a completion of a project or a phase of a project, whereas an external event type revenue amount 411 may be an immediate charge without any further dependency. Note that differences may exist between such kinds of revenue generating processes 401 and the underlying respective revenue amounts (with regards to amounts, conditions, recurrence, etc.). This results in a multitude of possible ways in which other services and software (such as those represented by applications or sub-systems 415) may interact with these revenue amounts.

As a result of the many differing ways in which revenue amount data may be characterized, other data manipulation processes 415 may need to have a specific programming interface in order to interact with revenue value data for the various events occurring in the revenue generating processes. In a typical merchant data processing system 352, the various data manipulation processes 415 may include a billing process 420, a revenue recognition process 422, a reporting process 424, and a forecasting process 426. Each of these data processes 415 may utilize data from various revenue events in a different way and for a different purpose. For example, a billing process 420 may handle a recurring bill of a subscription differently than a one-time sales order. A revenue process 422 may recognize revenue from a revenue event only after it occurs, whereas a forecasting process 426 may recognize revenue events of subscriptions or projects yet to be billed.

In performing reporting and forecasting, a data processing operation may include cost forecasts corresponding to the expected costs (based on a stream of forecast cost revenue amounts), forecast billings corresponding to expected billings (which are based on a stream of forecast billing values and an associated invoicing schedule), and/or forecast revenue corresponding to expected revenue (and based on a stream of forecast revenue values). Various reports and forecasts may also include a capability of evaluating "what-if" scenarios, for exploring the impact of possible options, variables, rules, conditions, or situations. Since there can be multiple streams of forecast events with associated values, it is desirable to support representing multiple possible expectations for the future performance of a revenue stream. This permits a report or reports to show best-case, worst-case, expected value and other scenarios without needing to know most (if not all) of the domain-specific details.

Another data processing operation (in addition to those suggested by processes 415) that is supported by an embodiment of the invention is that of costing. As the inventive ratable event record and rating engine provide a mechanism for "weighting" or "valuing" certain inputs, such inputs can be valued at the cost (direct, indirect, or the opportunity cost) to the business. Thus, as a result of the inventive processes and elements, the value of the ratable event generated may correspond to an amount that the business may bill to an end customer, to how much revenue can be recognized within an overall bill, or to the amount (cost) incurred by the business in providing a service or product to a customer. Note that this last aspect (the cost) may impact cash flow projections, alter investment decisions, trigger a need for additional funding, etc.

One impact of these disparate revenue generating processes 401 and data processes 415 is that in conventional systems, a different programmatic interface is typically required between any one revenue generating process and any one data process (such as a data processing application). Therefore, each connecting line 414 in FIG. 4 illustrates or represents a separate programmatic interface that is required for proper handling and manipulation of the potentially unique process-to-process relationships that may exist between modules and sub-modules of the merchant data processing system 352. Thus, using conventional systems, it becomes a relatively complicated and inefficient process to reconcile billing, revenue, reports and forecast data that are originating from multiple sources of revenue data (particularly as a business develops new sources of revenue or business models).

Figure 5:
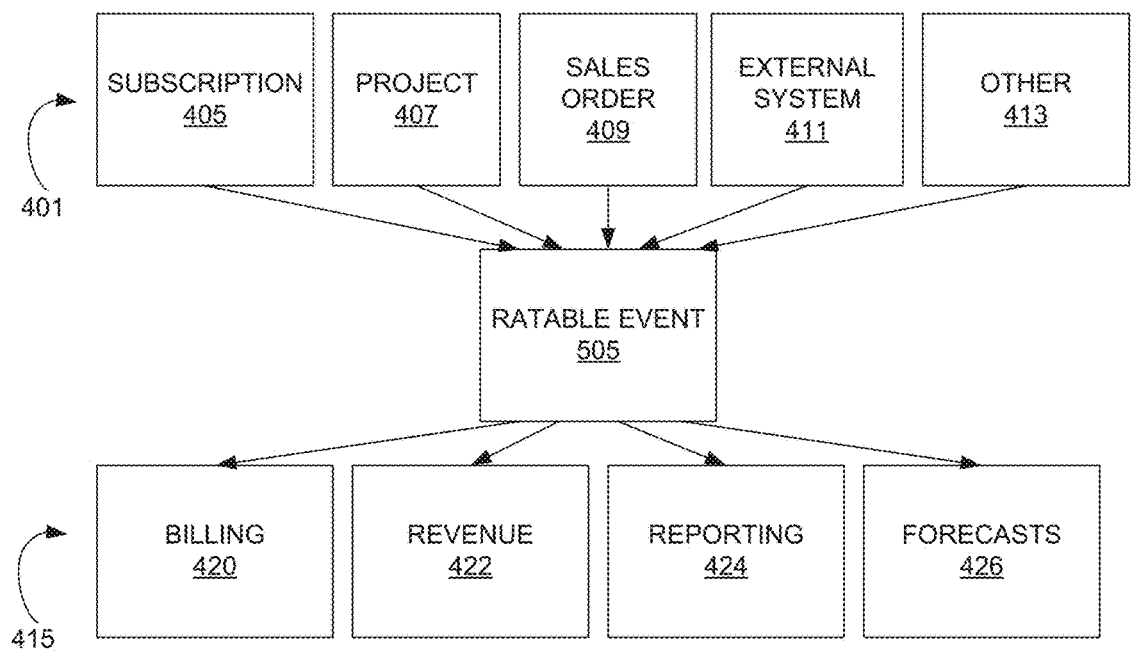
FIG. 5 is a diagram illustrating relationships between possible sources of charges, a ratable event record or records, and possible uses of the record(s) to generate information about a business, and that may be used when implementing an embodiment of the subject matter disclosed herein.

In contrast, FIG. 5 is a diagram illustrating relationships between possible sources of ratable events, a ratable event or events, and possible uses of the ratable event(s) to generate information about a business, and that may be used to represent an implementation of an embodiment of the subject matter disclosed herein. In FIG. 5, a ratable event 505 may be created and used to store data about a ratable event from one or more of the revenue generating processes 401 discussed above. Thus, when a revenue generating process 401 (e.g., a subscription revenue process 405, a project revenue process 407, a sales order revenue process 409, an external system revenue process 411, and/or other revenue processes 413) creates ratable event data, such ratable event data may be stored in a ratable event 505.

The ratable event 505 may have one or more attributes that are associated with it and which are used to characterize the ratable event; such attributes may include one or more of those characteristics noted in the "field" column in the chart below. These characteristics/fields represent those aspects of a revenue generating event that may need to be used in one or more of the data processing operations that may be performed on the data in the ratable event. Population or definition of the attributes may be used to represent and store data that is associated with a variety of types of charge events; this has the result that almost any desired type of revenue amount data or revenue generating event may be represented by data stored in a single type of ratable event, with the ratable event record having a common format or structure.

Note that this may mean that a particular revenue generating event does not generate data corresponding to one or more (i.e., some of the) attributes of a ratable event. For example, a sales order charge may not have a frequency of occurrence or a duration in the manner that a subscription charge has. Similarly, not every data process 415 may need to know whether a frequency of occurrence attribute (as an example, as this applies to other attributes as well) is available for a record, as some data processes 415 may only need data such as an actual revenue from charges (i.e., current data, such as with a revenue process 422). A standard, common, or canonical format for a ratable event record includes a set of possible attributes/fields, where these attributes/fields include all of those needed by any of the data processes being used to access the ratable event (where these attributes may be determined by an indexing or evaluation of the data processes); thus, each data process 415 needs only to access the ratable event and obtain the data it needs as located in the appropriate attributes/fields. In this manner, the single structure or format for a ratable event 505 simplifies the data exchange between data population events from a revenue generation process 401 and data retrieval for a data process 415.

Thus, a ratable event 505 (and the related systems and methods) assist in facilitating a back-office support system (BOSS) centered on the use of a ratable event 505 as the data structure for representing and capturing revenue event related data. Note that each ratable event may have an equivalent number of attributes/fields, so that any data retrieval operations may be mapped to one format or type of record, i.e., a ratable event. From the ratable event 505, a variety of back office business processes may be supported, including but not limited to (or required to include), billing, revenue recognition, reporting, and forecasting. In the various embodiments of the invention, a single-source of data, the ratable event 505, makes it possible and efficient to maintain critical business information in synchronization, and to process such charge data more efficiently, flexibly, and reliably.

A ratable event 505 may include attributes/fields as discussed above. Such attributes may include one or more of the attributes (as denoted in the "field" column) noted in the following chart/table:

| Field (Attribute) | Description |
| --- | --- |
| Source | The revenue source which when mediated gave rise to this ratable event |
| Source Event | The event within the revenue source process which when mediated gave rise to this ratable event |
| Customer | The customer associated with the revenue event within the source process |
| Item | The item or account associated with the revenue event within the source process |
| Quantity | The mediated quantity that will be rated |
| Value | The financial value associated with the ratable event; i.e., the amount that will be billed, recorded, allocated, or assessed upon occurrence or other processing of the event |
| Currency | The currency used to express the Value |
| Charge Stage | Option for indicating 'Non-Billable' or 'Non-Invoice able' |
| Service Start Date: | The start date of the service period that the charge represents |
| Service Stop/End date: | The end date of the service period that the charge represents |

As suggested, the advantages of having a revenue-centric record 505 available for use by multiple data processes are numerous and significant. For example, the inventive system and methods may be used to reduce billable time entered against a project into a set of ratable events that enable proper revenue recognition at month end, generate an invoice at end-of-quarter, and/or produce regular revenue forecasting reports.

Another advantage is that users can create their own domain-specific applications or rules to be executed as part of using the inventive ratable event and associated methods, and then have ratable events generated as a result of those applications or rules treated like any other charge in the business data system (such as being billed alongside existing defined ratable event sources or domains). For example, a merchant data processing system 352 may support creating ratable events for work done against a project. As part of that capability, the system 352 may determine time entered by employees and create sets of charges based on rules that determine the value of such time to the project (which may depend on the employee's hourly rate, title or ranking).

A given business, however, may have additional components that contribute to costs and/or billing. For example, a business may rent equipment when there is work on a project, and the business charges for that service based on rental time (length) of the equipment and how long the business actually has the rental "turned on" or "in use." In this example, the business may define additional parameters on top of a basic service to determine a value for and create ratable events for such rentals; then, related non-rental charges may be billed in standard invoices alongside the time-based rental charges. Such data may also be used in revenue recognition processes or forecast reports.

In another case, a business may wish to allow the generation of ratable events with associated charges or costs based on the value of a certain task or employee to the overall value/cost of a project, to the end-customer, or to the business that provides the employees (e.g., based on the profit margin associated with work performed by a certain employee). Note that these use cases would be more difficult (or not possible) to accommodate using a conventional system, and might also be more likely to be subject to errors due to a lack of using a common source of data (for example, where charges or events occur at different times or are captured by isolated systems).

Further, the use of the ratable event and its associated processes as part of an integrated business data processing system also permits a business to condition the generation and/or amount of a charge or cost on business relevant data, where such data may be dynamic and is accessed in real-time or pseudo real-time. Such business relevant data may include (but is not limited to, or required to include) sales, profits, revenue, overhead, inventory, or other organizational or financial indicators.

In a typical example, use of the inventive system and methods facilitates a more efficient and reliable approach to generating and processing charges derived from multiple sources, as is described in the following. As a first step, a sales person may enter into an agreement to sell a set of products and/or services to a customer. The agreement may stipulate that general time worked will be billed at $10/hour, with the exceptions that time worked by a partner will be billed at $20/hour and time worked by anyone on the weekends will be billed at $25/hour. The data processing applications and modules to create ratable events that reflect this pricing rule may be built into the merchant data processing system 352 system, as part of the billable time functionality. Further, in this example, the overall service provided to the customer by this agreement may require rental of chargeable equipment billed at $10/day for the duration of the project, plus $10/hour for each hour that the equipment is in use.

After the agreement is in place and ratable events are established for deriving, collecting and storing charge data, employees and partners may enter time into a time-keeping system within the merchant data processing system 352. In this example, a first employee named Bob may enter eight hours of regular time in a first month of August such that the system creates a ratable event with an $80 value (8*10). In a second month of September, Bob may enter four hours of time on Sunday such that the system creates a ratable event with a $100 value (4*25). Further, a second employee named Mary, a Partner, may enter two hours of regular time such that the system creates a ratable event with a $40 value (2*20). Further, a piece of equipment may be rented for five days in August, resulting in the system creating a ratable event with a $50 value (1*5*10), and rented for five days in September, also resulting in the system creating a ratable event with a $50 value (1*5*10). Bob may operate the equipment for eight hours in August and four hours in September, resulting in the system creating ratable events with values of $80 (8*10) and $40 (4*10), respectively. Mary operates the equipment for two hours in August, resulting in the system creating a ratable event with a value of $20 (2*10).

Each of the above scenarios (i.e., possible sources of a ratable event) may be stored in a single ratable event or in a group of related (i.e., linked or otherwise associated) ratable events. In this manner, the data described above may be stored in a field/parameter associated with an attribute of a ratable event so that uniformity across disparate types/sources of charges may be maintained. Thus, in this example, a ratable event for Bob's time may be created to track and store Bob's time, a ratable event for Mary's time may be created and stored to track Mary's time, a ratable event may be created to track and store the equipment rental time, and a ratable event may be created and stored to track equipment use charges. The charge data from the ratable events may then be combined as desired in accordance with the needs of a specific workflow or application (e.g., costing, revenue forecasting, revenue recognition, etc.). The combination may include the use of filtering or weighting to reflect the desired significance/impact of a specific charge source.

As mentioned, depending upon the workflow or application, various data manipulation processes may retrieve and utilize the charge data. Thus, in performing revenue recognition, a business can recognize all of the work performed in a given accounting period. In this example, August revenue received will be $210 (the sum of all August ratable events) and September revenue received will be $250 (the sum of all September ratable events). Further, in a billing workflow, a billing clerk may create a single invoice for $460, including the charge from all 6 of the ratable events mentioned previously.

As mentioned, a merchant data processing system 352 may support domain-specific sources for ratable events (i.e., other types of ratable event generating events or categories), including (but not limited to, or required to include):

Billable Time: this may be the total time billed by a record-keeper, a group of record-keepers, for a project, a business, or the like;

Billable Expenses: this may be the total expenses billed by a record-keeper, a group of record-keepers, a project, a business, or the like;

Project Progress: this may be expressed as a percentage of the total fixed bid value of a project based on hours of work, the percentage of the total billed over a regular time interval (e.g. monthly), etc.;

Project Milestones: generally, these may be fees/payments associated with the completion of a task or set of tasks that are part of a project plan;

Date-Based Charges: these may be total date-based charges billed by a record-keeper, a group of record-keepers, for a project, a business, or the like;

Subscription and Recurring Charges: these may be any kind of recurring expense, such as the service component of a phone/cable/utility bill, support or warranty based charges, etc.;

Usage-Based Charges: these may be any usage-based charge, such as the component of an electric bill that is based on how many kilowatt hours were used during a given period; or Item Fulfillment/Deliveries: this may be the amount charged for selling/delivering an item to a customer.

An important aspect of the above example ratable event sources is that they represent aspects of a business operation that can generate revenue or costs, or in some cases other obligations. Each may, alone or in combination with other sources, represent an aspect that the business wishes to track and take into account when determining an operational metric, plan for future development, etc. Conventionally, such planning requires accessing multiple data stores and using specific applications, where such data stores and applications may be isolated from each other. In contrast, embodiments of the inventive system and methods use the common data element of the ratable event to provide a more efficient and accurate way of taking into account the various business operations and the impact of those operations on the workflows of interest (e.g., revenue recognition, forecasts, tax obligations, etc.).

As mentioned, in addition to conventional workflows, users may define their own applications/workflow that track domain-specific data and which include logic for translating business related events into charges in accordance with certain conditions, triggers, or rules. Further, the conditions, triggers, or rules may depend upon business related data stored on, or generated by, the multi-tenant or business data processing platform (e.g., element 108 of FIG. 1 or element 352 of FIG. 3). For example, a business may wish to be able to cause a certain event or the occurrence of a certain value of business related data (e.g., ERP, CRM, eCommerce, financial, HR) to trigger the generation of a charge of a specific amount for purposes of tracking an operational aspect of the business. The operational aspect may be of importance to the business but may not be common to other businesses, so that conventional approaches would need to be modified (or in some cases re-engineered) in order to accommodate it. Embodiments of the inventive system and methods provide an effective and more easily implemented approach to accommodating the needs of different businesses and business models.

For example, a business may define its own custom records and custom rules for valuing rented equipment. A user may define an arbitrarily complex model for pricing and billing the equipment they rent to complete a task, and it would appear seamlessly within the system as if it were natively supported. Further, a business may define additional pricing models for supported items. In this way users may define their own way of associating a value with the above inputs; this may be handled by providing a custom rule for determining the charge amount associated with a given input or inputs (where, as noted those inputs may include the value(s) of relevant business data).

Conventional approaches to solving the problems addressed by embodiments of the invention generally focus on taking one of the domain aspects (such as revenue or forecasting) from end-to-end. For example, a user could buy a project management and billing system that would enable them to bill the project components, but the rental charges would be handled by a separate system. In theory, the rental invoice lines could be added manually to the project invoices as one-off lines; however, they would not be seamlessly included, and would not necessarily be included in other components of the system, such as the reporting and revenue recognition workflows.

As noted, based on an embodiment of the inventive system and methods, a user can define their own application/workflow that tracks domain-specific data and implements the desired workflow or processing logic, and easily integrate it into the billing framework. For example, a business could define their own custom records and custom rules for valuing one or more of the following:

Rented Equipment—as mentioned in the previous example, a user could define an arbitrarily complex model for pricing and billing equipment they have to rent, and it would appear seamlessly within the overall data processing system as if it were natively supported;

Alternate Business Models—there are more possible business models then there is dedicated software to support such models, but by using the inventive system and methods a business can provide custom rules for tracking each event they bill and how they bill for it, and then the charges for an event can be consolidated into a single vision of the business from an operational and reporting perspective; or Complicated Pricing Models for Natively Supported Items—users may want to define their own way of associating a value with the inputs (such as the record attributes); this can be handled by providing a custom rule for determining the charge associated with a given input or set of inputs (such as an event, combination of events, a value of certain business data, etc.).

Besides billing, other accounting workflows supported by embodiments of the inventive system and methods may include (but are not limited to, or required to include) the following:

Costing: since the ratable events and the rating engine are a way of "valuing" or weighting certain inputs, those inputs can be valued for what they cost the business, what they can be billed for to the end customer, for how much revenue can be recognized, or for other purposes;

Billing: ratable events generate charges that are combined onto Invoices;

Revenue Recognition: ratable events generate revenue recognition journals on a revenue recognition (RevRec) specified schedule;

Depreciation: asset purchase, sale, disposal events get rated and result in generation of depreciation journals on a schedule based on the depreciation rule applied; and Commissions (incentive compensation): commissionable events are captured and rated based on the sales team's commission plan rules, generating commission payable charges that are collected and paid out on a paycheck.

Reports supported by embodiments of the inventive system and methods may include (but are not limited to, or required to include) the following:

Cost Forecasts: expected costs based on a stream of forecast cost charges;

Forecast Billings: expected billings based on a stream of forecast billing charges and an associated invoicing schedule;

Forecast Revenue: expected revenue based on a stream of forecast revenue charges; and "What-If" Scenarios: since there can be multiple streams of forecast charges, embodiments can support representing multiple possible expectations for future performance. Reports/forecasts can look at best-case, worst-case, expected value and other scenarios without needing to know the domain-specific details.

Figure 7:
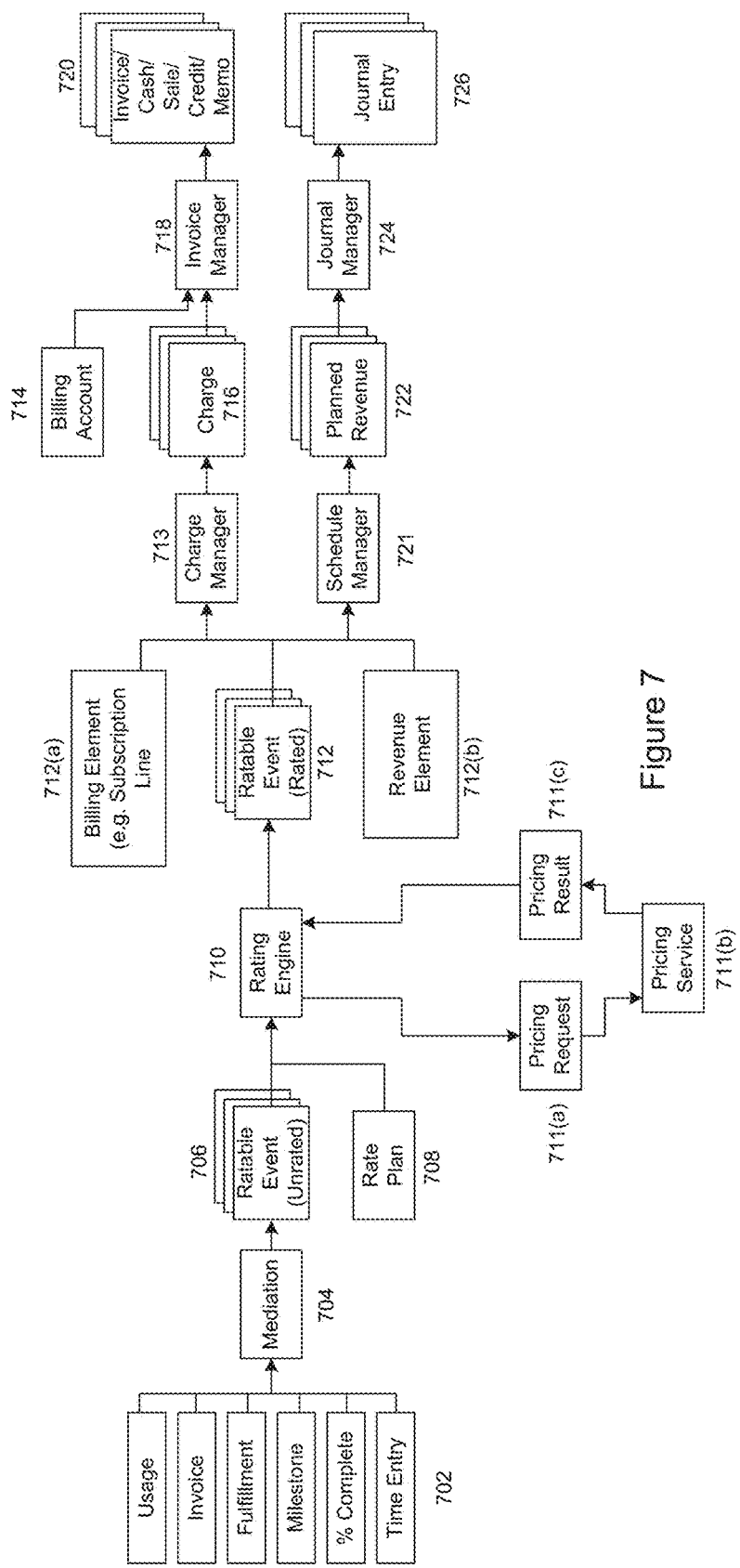
FIG. 7 is a diagram illustrating a workflow corresponding to several aspects of billing, including charge record, ratable events, and usage rating, that may be implemented as part of an embodiment of the subject matter disclosed herein.

FIG. 7 is a diagram illustrating a workflow corresponding to several aspects of billing, including charge record, ratable events, and usage rating, that may be implemented as part of an embodiment of the subject matter disclosed herein. As discussed, aspects of the ratable event described herein may be used in conjunction with additional elements of an overall workflow to provide a more efficient and reliable way of tracking and processing charges. As will be discussed with reference to FIG. 7, a ratable event data structure may be used with an agreement element and usage ratings to provide users with data about rates, revenue, billing, projections, and other related services within the context of a merchant data processing system 352 (as illustrated in FIG. 3). As such, a unified billing, reporting, and forecasting system that utilizes the inventive ratable event records may be realized.

In a typical use case, prior to generating a ratable event various data may be used to describe aspects of an agreement between two parties (e.g., the merchant/vendor and a customer/user). The operative aspects of an agreement may be expressed as an agreement element; the agreement element may include data elements corresponding to aspects of an agreement, including (for example) a billing element, a revenue element, and a rate plan element.

For example, on a specific customer project, a customer may be billed $10/hour on the last day of the month, and the revenue may be recognized immediately. Thus, this "agreement" may be expressed by three elements. A first element may be a billing element that includes data corresponding to how ratable events will be billed to the customer, e.g., billed on the last day of the month when the bill will be mailed to a specific address. A second element may be a revenue element that includes data corresponding to how revenue from ratable events will be recognized, e.g., recognized as soon as the ratable events are invoiced in this case. A third element may be a rate plan element that includes data corresponding to how ratable events that reference this element will be rated/priced, e.g., $10/hour. Thus, in this example, the value of the ratable event and of a subsequent charge record may be determined (at least in part) by the evaluation of data in agreement elements or contractual arrangements.

Further, the ratable event discussed above may also have an associated data record that includes additional information or levels of data. In such cases, a ratable event may provide other data that is processed before a charge is created or modified based on the event (this may be termed a ratable event record). A ratable event record may be created using additional processing steps or operations, such as a mediation step, a rating step, a charge creation step, and a planned revenue creation step, which are shown in FIG. 7 and described in greater detail in the following.

Returning to FIG. 7, one or more sources of input data 702 may be used, where these sources may include measures or values of the usage of a service or feature, a measure of the completion of a task or project, an indicator signifying the achievement or completion of a task, a number of hours devoted to a task, etc. A mediation stage (which may include one or more steps, processes, functions, or operations) 704 corresponds to the collection of data relevant to the creation of a ratable event from a domain-specific source. As noted, such data 702 may include a project milestone, a level of fulfillment, a subscription usage record, billable time/expense entries, a percentage complete record, invoice and billings records, and other aspects of billing and time entry used to enable the system to handle ratable events.

Further, in some embodiments, the operation of mediation stage 704 may be controlled or activated by one or more rules, conditions, constraints, comparisons, formulas, etc. that are provided by a user. The one or more rules, conditions, constraints, comparisons or formulas may be defined in terms of business related data or events, and may be part of executing a specific user or business workflow. The business related data or events may be contained in a system or process that tracks, stores, and processes the data or events, such as an ERP system, a CRM system, a HR system, a financial or accounting system, etc.

For example, if a user works 10 hours of billable time, there may be a ratable event 706 with a quantity of 10 referencing an associated agreement element. A rating step corresponds to collection of data about the association of the ratable event with a dollar value. In the billable time example, a rating engine 710 may use the agreement element (such as a data record containing certain terms of an agreement or contract) to find a rate plan 708 of $10/hour; then, the rating engine 710 may apply the rate from the rate plan to the ratable event created by the mediation step 704 to get an amount (or value) of $100 for the ratable event.

Note that in some cases, Rating Engine 710 (which, as with the other "engines" or "managers" illustrated may be implemented as a suitably programmed electronic processing element (such as a CPU, microprocessor, etc.) that executes a set of instructions) may request a "pricing" of a service or event (as suggested by Pricing Request 711(a), Pricing Service 711(b), and Pricing Result 711(c)). In one embodiment, Pricing Service 711(b) may operate to determine the value of a ratable event by reference to one or more of a specific rate plan, a set of conditions that determine the pricing for a ratable event based on an agreement, the values of a combination of business related data, whether a specified event has occurred, etc. Note that as with the identification of one or more ratable events, the pricing of a specific event may depend upon aspects of the workflow of a business, and is another customization that is enabled by use of the ratable event record described herein.

As with mediation stage 704, the operation of rating engine 710 and/or pricing service 711(b) may be controlled or activated by one or more rules, conditions, constraints, comparisons, formulas, etc. that are provided by a user. The one or more rules, conditions, constraints, comparisons or formulas may be defined in terms of business related data or events, and may be part of executing a specific user or business workflow. The business related data or events may be contained in a system or process that tracks, stores, and processes the data or events, such as an ERP system, a CRM system, a HR system, a financial or accounting system, etc.

The output of Rating Engine 710 is a ratable event that has been valued or rated 712. In order to perform the billing process and/or a revenue recognition process, this rated event data may need to be combined with data provided by a Billing Element 712(a) or a Revenue Element 712(b). Billing Element 712(a) may provide information regarding how ratable events will be billed to the customer, e.g., billed on the last day of the month when the bill will be mailed to a specific address. Revenue Element 712(b) may provide information regarding how revenue from ratable events will be recognized, for example, being recognized as soon as the ratable events are invoiced (or in accordance with a relevant schedule, etc.).

A charge manager 713 may execute or cause the execution of a charge creation step/process to use the agreement element (or other relevant source of terms, agreements, obligations, etc.) to identify the billing account 714 (customer-specific billing details, such as billing cycle dates, billing address, and the like), and apply the collected data for the ratable event to create a charge record 716, which may then be used as an input to invoicing, invoice forecasting, and invoice generating operations or reports 720 (under the control of an invoice manager process or operation 718).

Note that a similar approach may be used to implement a planned revenue creation process or operation that may be used to support workflows such as revenue recognition, forecasting, and historical reporting. Schedule Manager 721 represents a process, stage, or operation that is similar to the charge manager process, but is an alternate implementation that may be used to handle planned revenue. A planned revenue engine or process 722 may be used to create planned revenue records. For example, a planned revenue engine 722 may create planned revenue records to support workflows such as revenue recognition, forecasting, and historical reporting. This may involve the use of a journal manager 724 to control the generation of one or more journal entries 726 based on the planned revenue.

As described herein, the subject matter of one or more embodiments of the invention is directed to methods, systems, and apparatuses for improving the data handling, processing, and interaction(s) by business data processing systems or sub-systems (such as the multi-tenant system described herein) of charge generating events that are based on business activities. In some embodiments, the invention includes implementing and using a data structure or record termed a "ratable event" to enable efficient use of charges originating from multiple sources to generate reports and forecasts for multiple other services, functions, or recipients.

In at least one embodiment, the ratable event defines a single-source of data related to sources of charges and amounts of charges; this single-source of data enables critical business information to be maintained and synchronized across multiple business sub-systems. Thus, instead of requiring relationships and interactions between multiple sources and multiple processes, a ratable event provides a single data record for a charge generated by an event; in this way, charge sources and processes that utilize data from the charge sources may interact using a single type of data record (and its standardized format and definition).

Figure 8:
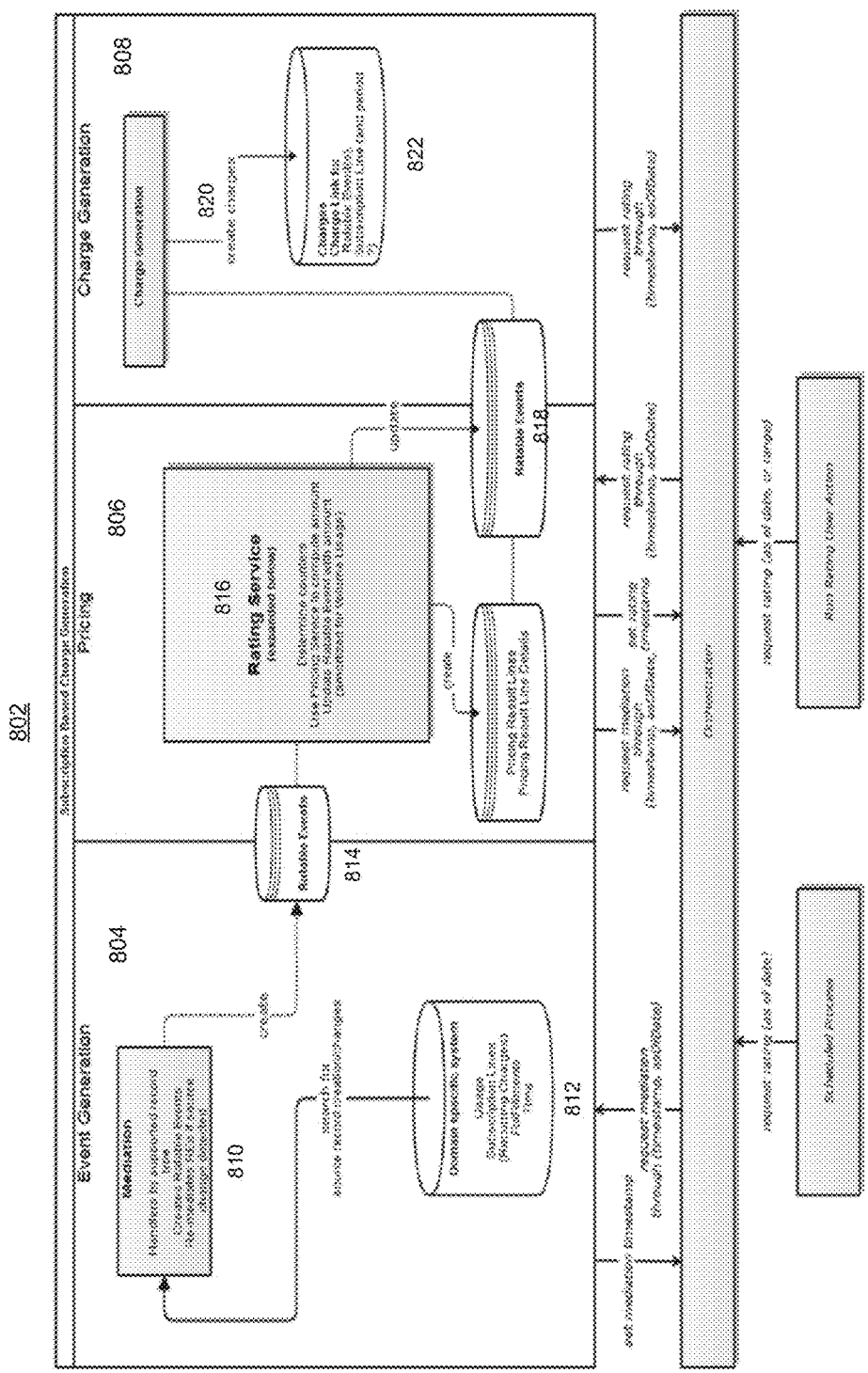
FIG. 8 is a diagram illustrating further details regarding the data flow and elements that may be present in an implementation of an embodiment of the inventive system and methods that includes a process or operation for subscription based charges or events.

FIG. 8 is a diagram illustrating further details regarding the data flow and elements that may be present in an implementation of an embodiment of the inventive system and methods that includes a process or operation for subscription based charges. As shown in the figure, a subscription charge generation engine 802 may include an event generation element or process 804, a pricing element or process 806, and a charge generation element or process 808. Event generation element or process 804 may include a mediation element or process 810 which operates to access, search, retrieve, and filter data from a domain-specific system or data store (such as suggested by data store or system 812). Mediation element or process 810 may process the accessed data to produce a ratable event 814, which is provided to a rating service or engine 816 (described in greater detail with reference to FIG. 9) that is part of pricing element or process 806.

Rating service or engine 816 operates to generate the value associated with a ratable event. This value may be the result of processing usage data, multi-tiered usage pricing data, and/or other account data in accordance with a subscription agreement. Once the value is determined, the ratable event data store 814 may be updated to reflect the value or price of each event (as suggested by element or process 818).

After the value of an event is determined, charge generation element or process 808 may be used to determine how the value or price of an event should be reflected by a charge. At this stage or operation, the value of the event may be converted to a charge based on one or more rules, criteria, conditions, etc. that are derived from an agreement or are part of a specific workflow (as suggested by element or process 820). After a charge is created, data regarding the charge is stored in data store 822, and may be used as part of a process to generate an invoice, make a projection or forecast, etc.

Figure 9:
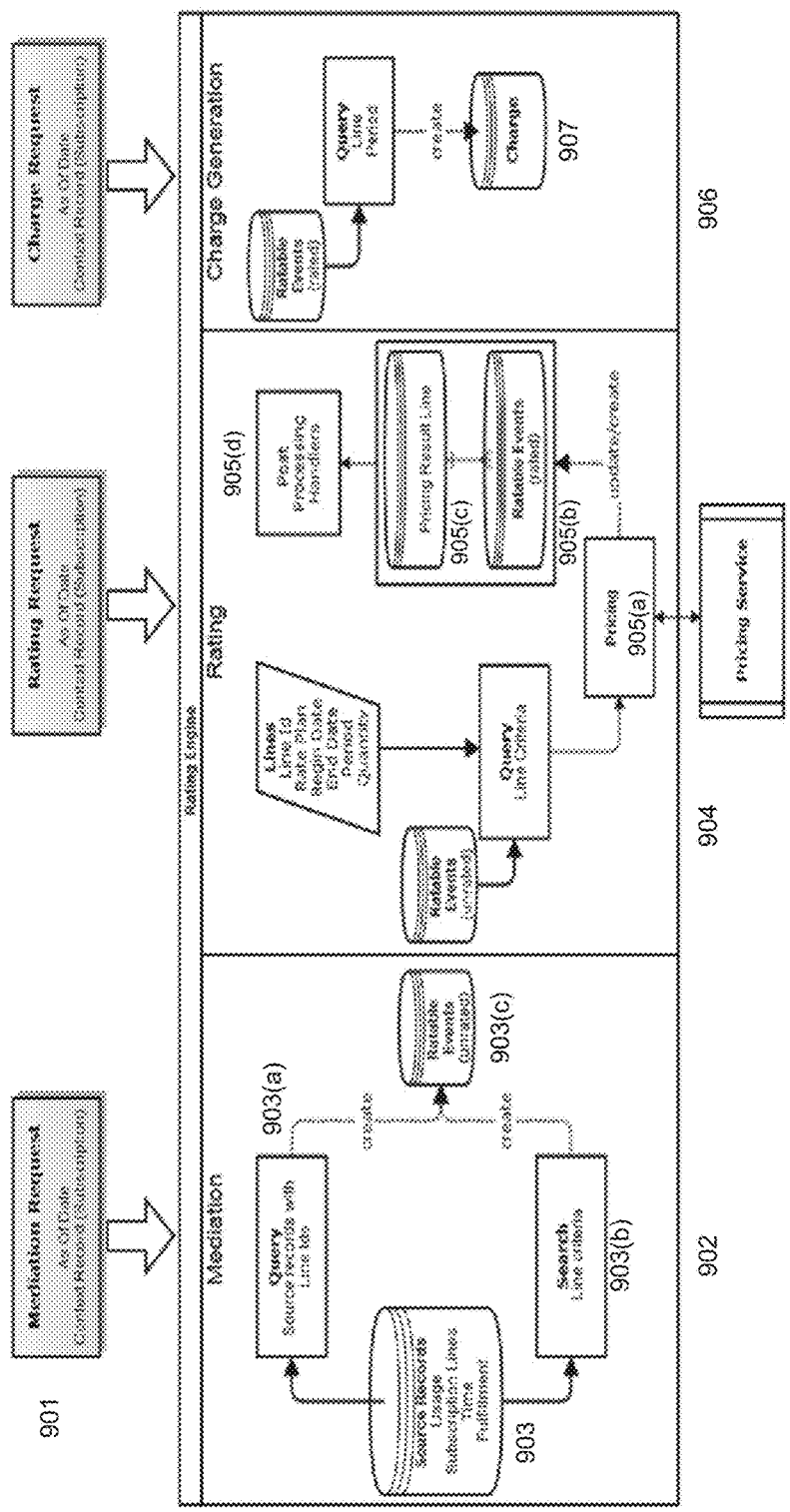
FIG. 9 is a diagram illustrating further details regarding the data flow and elements that may be present in an implementation of the rating service or engine shown in FIG. 8.

FIG. 9 is a diagram illustrating further details regarding the data flow and elements that may be present in an implementation of the rating service or engine 816 shown in FIG. 8. As shown in the figure, rating engine 816 may include a mediation process or operation 902, a rating or pricing process or operation 904, and a charge generation process or operation 906. As with the other mediation types of processes or operations (such as those illustrated in FIGS. 7 and 8), a mediation request 901 is received by mediation process 902. The request 901 results in the execution of mediation process 902, which includes accessing a source of data 903 and executing a search over that source (as suggested by process 903 (a) and 903(b) in the figure). The result or output of executing the query/search is a set of ratable (but presently unrated) events, as suggested by element 903(c). Ratable events 903(c) are passed to rating or pricing process or operation 904.

Source of data 903 may include one or more types or categories of data that may be utilized in determining a set of ratable events; for example, such sources may include usage data, subscription terms, indications of the execution of an event (such as a stage of a fulfillment process), time entries, etc. The query/search that is executed to identify a set of ratable events may be based on one or more conditions, rules, triggers, flags, etc. and represents an example of how the use of the ratable event record provides a mechanism that enables a business to implement a desired process (such as billing, revenue recognition, etc.) in a way that reflects the specific workflow of the business. For example, the query/search that is used to identify ratable events from the source of data may depend on the values of a combination of business related data, on whether a specified event has occurred, etc.

Once a set of ratable events 903(c) has been identified from the data, a rating/pricing process is executed by rating or pricing process or operation 904. This process or operation is responsible for evaluating each ratable event to determine how the event may be converted into a charge. This evaluation may depend upon a specific rate plan, a set of conditions that determine the pricing for a ratable event based on an agreement and/or the values of a combination of business related data, on whether a specified event has occurred, etc. In some embodiments, the conversion of an unrated but ratable event into a rated event 905(b) may depend upon execution of a pricing process or operation 905(a), which may access a pricing service. Note that as with the identification of one or more ratable events, the pricing of a specific event may depend upon aspects of the workflow of a business, and is another customization that is enabled by use of the charge record described herein. The rated events 905(b) may be converted into a pricing result 905(c) and then subjected to desired or needed post processing operations (as suggested by 905(d)).

After completion of the rating/pricing operations, each rated event is converted into a specific charge by the charge generation process or operation 906. This may involve determining a specific charge (or cost) associated with each ratable event based on the relevant agreement, discounts, business workflow, etc. The resulting charge associated with each rated event may be stored in a charge data store 907.

Note that the combination of a ratable event that provides a common format or data structure for use by the various business functions/applications (e.g., billing, revenue recognition, forecasting, inventory management, etc.) and the ability of a business to customize how ratable events are identified and evaluated (through the introduction of conditions, rules, triggers that depend upon an agreement or values of business relevant data) enables the business to more accurately and efficiently perform important business functions within an integrated system, instead of relying on multiple isolated systems or sources of data. This permits a business to implement its own workflows that take into account the specific needs of its customers, industry, regulatory requirements, etc.

By implementing the typically independent and specialized domains of billing/invoicing and revenue recognition in the form of a generic data structure of a ratable event and using a rules engine (such as the Rating Engine) to assign a value to an event, embodiments of the invention enable use of the data structure and engine to create items for both domains. This is of value to end-users because the described implementation environment of a multi-tenant platform (and its associated business related applications and data) may be used to provide services to customers whose businesses employ multiple revenue models (e.g., products and services, projects and subscriptions). These businesses desire to be able to create combined invoices that bill for these products/services together. These businesses also desire to be able to perform the required revenue recognition functions and operations, which may differ depending upon the revenue model being used by a business for a specific customer. Further, the end-users/businesses may desire to condition one or more of (a) whether a ratable event is generated or recognized as having occurred, (b) the value of a specific ratable event, or (c) how the value is recognized for purposes of compliance with revenue recognition requirements on a rule, condition, formula, etc. that may depend upon the operational status or workflow of the business (as reflected by the specific data relevant to that business that is stored on the platform in association with an ERP, CRM, HR, financial application, etc.).

Figure 6:
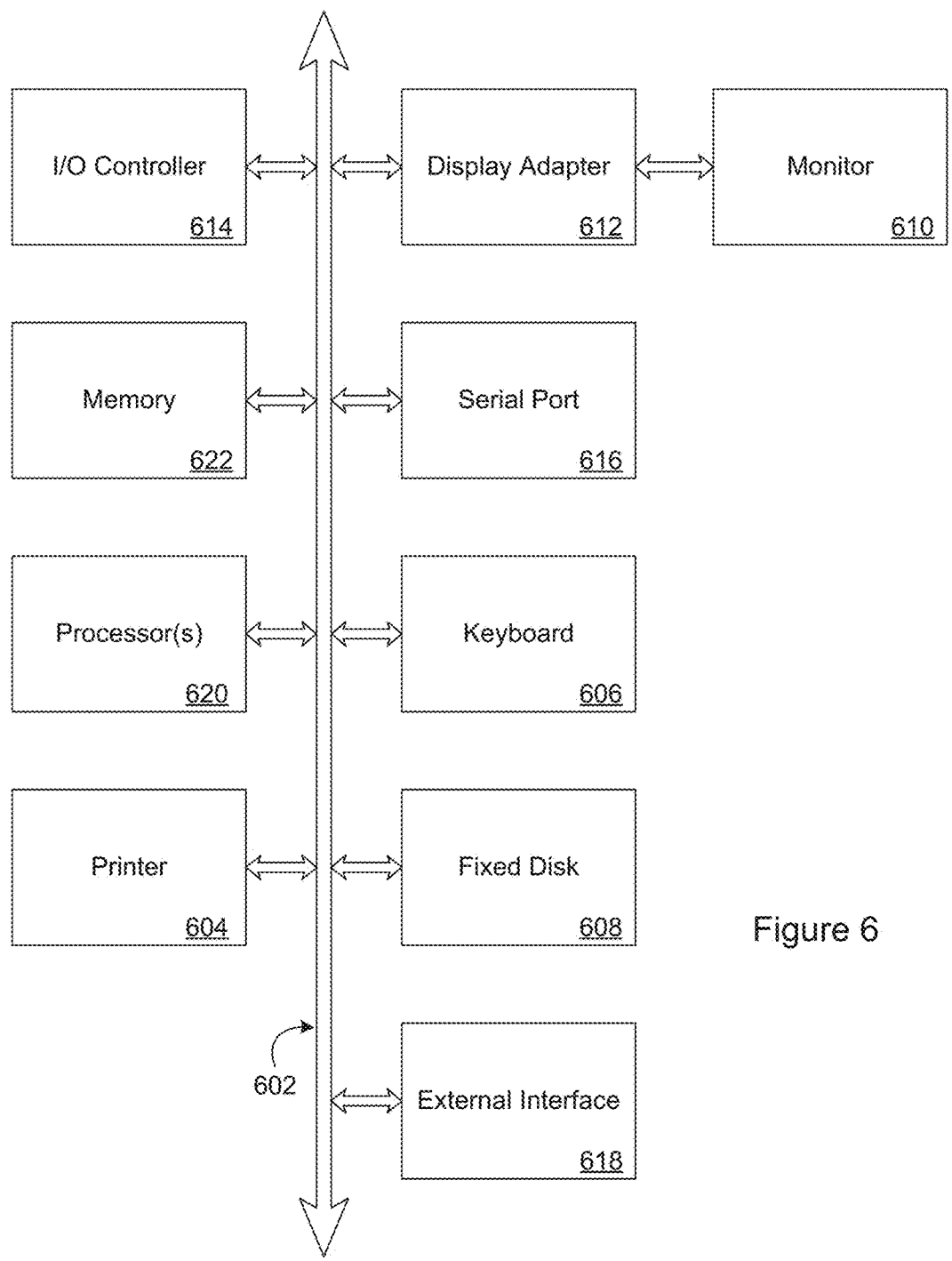
FIG. 6 is diagram illustrating elements or components that may be present in a computing device or system configured to implement a method, process, function, or operation in accordance with an embodiment of the subject matter disclosed herein.

In accordance with one embodiment, the system, apparatus, methods, processes, functions, and/or operations described herein may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

The present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g.; meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. An integrated business data processing system, comprising:
 an electronic data processor programmed with a set of executable instructions, which when executed, cause the system to perform
 a mediation process operable to (i) identify and access data associated with one or more event occurring as part of an operation of a business, wherein the data is generated in a non-standardized format by an isolated source, and (ii) store the data in a standard record format for a ratable event;
 a rating process operable to determine a value of one or more of the identified events;
 a scheduling process to determine how a value or values of the one or more of the identified events are to be used for purposes of a revenue recognition process;

a charge generation process to determine how a value or values of the one or more of the identified events are to be used for purposes of a billing process;

a process to create a journal entry in response to using the value or values of the one or more of the identified events for purposes of the revenue recognition process;

a process to create an invoice in response to using the value or values of the one or more of the identified events for purposes of the billing process; and a process to cause the invoice or the journal entry to be transmitted over a network to a computing device of a user.

2. The integrated business data processing system of claim 1, wherein the business data processing system is one of a set of business related applications installed on a multi-tenant business data processing platform.

3. The integrated business data processing system of claim 2, wherein the set of business related applications includes one or more of an ERP, a CRM, a HR, or a financial application.

4. The integrated business data processing system of claim 2, wherein the mediation process is controlled or activated by one or more of a rule, a condition, a constraint, a comparison, or a formula.

5. The integrated business data processing system of claim 4, wherein the one or more of a rule, condition, constraint, comparison, or formula are determined at least in part by business related data associated with a tenant of the multi-tenant platform.

6. The integrated business data processing system of claim 2, wherein the rating process is controlled or activated by one or more of a rule, a condition, a constraint, a comparison, or a formula.

7. The integrated business data processing system of claim 6, wherein the one or more of a rule, condition, constraint, comparison, or formula are determined at least in part by business related data associated with a tenant of the multi-tenant platform.

8. The integrated business data processing system of claim 1, wherein the rating process further comprises a pricing process, and further, wherein the pricing process is dependent on one or more of an agreement, a value or values of business related data, or whether a specified event has occurred.

9. The integrated business data processing system of claim 1, wherein the process to create a journal entry further comprises a process to create a revenue recognition journal entry or a depreciation journal entry.

10. The integrated data processing system of claim 1, wherein the process to create an invoice further comprises a process to create a bill or a forecast.

11. A method of processing business data, comprising:
representing a set of one or more ratable events occurring as part of the operation of the business and described in a non-standardized format as one or more records of a standard format for ratable events, wherein a ratable event is an event that generates data used to determine an item on an invoice or an event that generates data used to determine a revenue recognition schedule;

determining a first set of the one or more ratable events, wherein the determination is based on one or more of a rule, condition, constraint, comparison, or formula;

determining a value for each ratable event of the first set of ratable events, wherein the value is based on one or more of a rule, condition, constraint, comparison, or formula;

executing a scheduling process to determine how the value of each ratable event of the first set of ratable events is to be used for purposes of a revenue recognition process;

creating a journal entry in response to using the value of each ratable event of the first set of ratable events for purposes of the revenue recognition process;

determining a second set of the one or more ratable events, wherein the determination is based on one or more of a rule, condition, constraint, comparison, or formula;

determining a value for each ratable event of the second set of ratable events, wherein the value is based on one or more of a rule, condition, constraint, comparison, or formula;

executing a charge generation process to determine how the value of each ratable event of the second set of ratable events is to be used for purposes of a billing process;

creating an invoice in response to using the value of each ratable event of the second set of ratable events for purposes of the billing process; and transmitting the invoice or the journal entry over a network to a computing device of a user.

12. The method of claim 11, wherein the set of events occurring as part of the operation of the business include one or more of a sale of a product, a delivery of a service, a subscription for a product or service, a task, or a project.

13. The method of claim 11, wherein the determination of the first set of the one or more ratable events or of the second set of the one or more ratable events is based at least in part on data associated with the operation of the business.

14. The method of claim 13, wherein the data associated with the operation of the business includes one or more of ERP, CRM, HR, or financial data.

15. The method of claim 11, wherein the determination of the value for each ratable event of the first set of ratable events or the second set of ratable events is based at least in part on data associated with the operation of the business.

16. The method of claim 15, wherein the data associated with the operation of the business includes one or more of ERP, CRM, HR, or financial data.

17. The method of claim 11, wherein each of the one or more ratable events is associate with a set of attributes.

18. The method of claim 17, wherein the set of attributes includes a source, a value, a start date for a service, and a stop date for a service.

19. The method of claim 11, wherein the business is a tenant of a multi-tenant platform, and further, wherein the multi-tenant platform includes a set of business related applications, the set including one or more of an ERP, a CRM, a HR, or a financial application.

20. An integrated business data processing system, comprising:
an electronic data processor;
a memory operably connected to the processor; and
a non-transitory computer-readable medium operably connected to the processor and memory and storing a set of executable instructions, which when executed by at least the processor accessing the memory, cause the system to perform:
a mediation process operable to (i) identify and access data associated with a revenue-generating event occurring in one revenue generating process isolated from other revenue generating processes and (ii) store the data as a ratable event, wherein a ratable event is a data structure for representing the data that has a uniform format regardless of source for the data to enable other processes to be applied uniformly to the stored data;
a rating process operable to determine a value of the ratable event;
a scheduling process to determine how the value of the ratable event is to be used for purposes of a revenue recognition process;
a charge generation process to determine how the value of the ratable event is to be used for purposes of a billing process;
a process to create a journal entry in response to using the value of the ratable event for purposes of the revenue recognition process;
a process to create an invoice in response to using the value of the ratable event for purposes of the billing process; and
a process to cause the invoice or the journal entry to be transmitted over a network to a computing device of a user.

* * * * *